(12) United States Patent  (10) Patent No.: US 8,743,137 B2
Peters et al.  (45) Date of Patent: Jun. 3, 2014

(54) METHOD FOR ELECTRONIC COLOR MATCHING

(75) Inventors: Sean Peters, New Berlin, WI (US); Ron Rudolph, Brookfield, WI (US)

(73) Assignee: Edgenet, Inc., Atlanta, GA (US)

( * ) Notice: Subject to any disclaimer, the term of this patent is extended or adjusted under 35 U.S.C. 154(b) by 707 days.

(21) Appl. No.: 11/733,729

(22) Filed: Apr. 10, 2007

(65) Prior Publication Data

US 2007/0242877 A1  Oct. 18, 2007

Related U.S. Application Data

(60) Provisional application No. 60/790,697, filed on Apr. 10, 2006.

(51) Int. Cl.
G09G 5/02 (2006.01)

(52) U.S. Cl.
USPC .................... 345/593; 345/604; 345/589

(58) Field of Classification Search
USPC .................... 345/593, 604, 589; 711/203
See application file for complete search history.

(56) References Cited

U.S. PATENT DOCUMENTS

| | | | | |
|---|---|---|---|---|
| 4,991,092 A * | 2/1991 | Greensite | | 382/131 |
| 5,085,325 A | 2/1992 | Jones et al. | | |
| 5,646,650 A * | 7/1997 | Miller et al. | | 345/179 |
| 5,668,633 A | 9/1997 | Cheetam et al. | | |
| 5,751,450 A * | 5/1998 | Robinson | | 358/504 |
| 5,760,913 A * | 6/1998 | Falk | | 382/167 |
| 6,130,756 A * | 10/2000 | Grady et al. | | 358/1.1 |
| 6,525,732 B1 * | 2/2003 | Gadh et al. | | 345/428 |
| 6,963,425 B1 | 11/2005 | Nair et al. | | |
| 6,999,636 B1 | 2/2006 | Enokida et al. | | |
| 2004/0179101 A1 * | 9/2004 | Bodnar et al. | | 348/188 |
| 2006/0071938 A1 * | 4/2006 | Richardson et al. | | 345/591 |
| 2006/0239571 A1 * | 10/2006 | Dong et al. | | 382/236 |
| 2007/0058858 A1 | 3/2007 | Harville et al. | | |
| 2007/0058859 A1 | 3/2007 | Baker et al. | | |
| 2007/0058860 A1 | 3/2007 | Harville et al. | | |
| 2007/0071314 A1 | 3/2007 | Bhatti et al. | | |
| 2007/0091336 A1 * | 4/2007 | Abad Peiro et al. | | 358/1.9 |
| 2008/0007787 A1 * | 1/2008 | Ptucha et al. | | 358/3.26 |

OTHER PUBLICATIONS

Swain, Michael J., "Color Indexing," *International Journal of Computer Vision*, vol. 7:1, pp. 11-32, 1991.

* cited by examiner

*Primary Examiner* — Ke Xiao
*Assistant Examiner* — Robert Craddock
(74) *Attorney, Agent, or Firm* — Joseph T. Leone; Daniel A. Blasiole; DeWitt, Ross & Stevens SC (57) ABSTRACT

Disclosed is a method to define automatically, in a pre-selected color space, at least one user-provided sample color. The method includes defining at least one target color within the color space to yield a standard color data set and providing a physical color swatch corresponding to the defined target color. The user then provides a digitized image comprising the user-provided sample color juxtaposed with the physical color swatch, to yield a sample color data set. The sample color data set is then compared to the standard color data set by means of a program stored on a programmable computer to determine a set of coordinates within the color space that defines the user-provided sample color.

18 Claims, 4 Drawing Sheets

METHOD FOR ELECTRONIC COLOR MATCHING

CROSS-REFERENCE TO RELATED APPLICATIONS

Priority is claimed to provisional application Ser. No. 60/790,697, filed Apr. 10, 2006, which is incorporated herein by reference.

FIELD OF THE INVENTION

The invention is directed to a method to define automatically, in a pre-selected color space, a user-provided sample color. In the preferred version of the invention, the user-provided sample color is provided in the form of an electronic digitized image that includes an image of the sample color to be defined in the color space and at least one image of a target color. The method is implemented automatically, by means of a programmable computer, and is preferably carried out via a global computer network such as the Internet.

DETAILED DESCRIPTION OF THE INVENTION

A target color is typically reproduced by determining a set of pigments and loadings that yield the target color under all lighting conditions. Existing color matching practices use a color measuring system to match the color of a submitted standard (i.e., a color swatch to be matched). A typical conventional system is the MTS Color Match Software provided by MTS Colorimetrie Inc. This color measuring system consists of a spectrophotometer attached to a personal computer with software to control the system. The color matching process consists of reading the color of the swatch (using the spectrophotometer) and storing it in the computer. The individual color matcher then decides how many colorants should be used in the color formula and which colorants the computer can use when calculating the match. The computer will then attempt every combination of the selected colorants and present to the user the colorants and loadings that best match the target color. Using the computer-generated formula (that is, the selected colorants and the selected loadings), the color matcher will run a trial batch to see if the computer-generated formula gives the target color. If the target color is matched, then the process is finished.

However, if the target color is not matched, then the color matcher can use the computer to help determine which of the colorants to add to make the color closer to the target color. This process is done by changing the concentrations of the colorants and then having the computer calculate the relative change in the color. With repeated calculations it becomes possible to determine if a change in the concentration of the colorants can improve the color match.

There are several drawbacks associated with using existing color matching systems, such as the one described in the previous paragraph. One problem with using existing color matching systems is that these systems require a color swatch. In some instances (such as when trying to match the exterior of a house) finding a suitable swatch to be analyzed by the spectrophotometer is difficult, if not impossible. Plus, even if a suitable swatch can be found, it must be brought to the point store (where the spectrophotometer is located). While the typical consumer could purchase a spectrophotometer if he so desired, it is not a piece of equipment most consumers are going to use more than a few times in the course of their lives. See, for example, U.S. Pat. No. 5,668,633 and the earlier U.S. Patents cited therein.

In machine vision applications, color is a powerful descriptor that often simplifies object identification and extraction from a scene. Color characterization, location, and comparison is an important part of machine vision and is used in a large class of assembly and packaging inspection applications. Inspection involves verifying that the correct components are present in the correct locations. For example, color information may be used in inspecting printed circuit boards containing a variety of components; including diodes, resistors, integrated circuits, and capacitors. These components are usually placed on a circuit board using automatic equipment, and a machine vision system is useful to verify that all components have been placed in the appropriate positions.

As another example, color information is widely used in the automotive industry to verify the presence of correct components in automotive assemblies. Components in these assemblies are very often multicolored. For example, color characterization may be used to characterize and inspect fuses in junction boxes, e.g., to determine whether all fuses are present and in the correct locations. As another example, it is often necessary to match a fabric in one part of a multi-color automobile interior. A color characterization method may be used to determine which of several fabrics is being used.

A color space (or color model) is a way of representing colors and their relationship to each other. A color space is essentially a multi-dimensional system and a subspace within that system where each color is represented by a single point or vector. Image processing and machine vision systems use several different color spaces including RGB (red, green blue), HSI (hue, saturation, intensity; also known as HSL—hue, saturation, luminosity), HSV (hue, saturation, value), CMY (cyan, magenta, yellow), and CMYK (cyan, magenta, yellow, black). The RGB, CMY, and CMYK color spaces function in essentially the same fashion, although RGB is "additive" and is used predominantly to calibrate color display monitors, while CMY is "subtractive," and is used extensively in the dye, pigment, and printing industries. (That is, RGB defines colors formed by adding light beams together, as in a monitor; CMY defines colors by the light reflected from the surface—and thus absorbed colors are subtracted to yield the final reflected color, as in printed or painted material.) The RGB color space will be described by way of example. In the RGB space, each color appears in its primary spectral components of red, green, and blue. This RGB color space is based on a Cartesian coordinate system. The RGB model is represented by a 3-dimensional cube with red, green, and blue at the edges of each axis. Each point in the cube represents a color, and the coordinates of that point represent the amount of red, green and blue components present in that color.

The Hue, Saturation, Intensity (HSI) or Hue, Saturation, Luminance (HSL) color space was developed to put color in terms that are easier for humans to quantify. The hue component is "color" in the conventional sense of the word; such as orange, green, violet, etc. (the ROY G. BIV mnemonic for the colors of the rainbow (red, orange, yellow, green, blue, indigo, violet) is one way of visualizing the full range of visible hues). Thus, hue represents the dominant color as perceived by an observer. Saturation refers to the amount or richness of color present. Saturation is measured by the amount of white light mixed with a hue. In a pure spectrum, colors are fully saturated. Colors such as pink (red and white) and lavender (purple and white) are less saturated. The intensity or light component refers to the amount of grayness present in the image.

Colors represented in HSI model space have certain advantages over colors represented in RGB or CMY model space.

Most notably, HSI includes an intensity (luminance) component separate from the color information. Second, the intimate relation between hue and saturation more closely represents how humans actually perceive color. That being said, any of the color spaces now known or developed in the future, including RGB, CMY, CMYK, HIS and HSL, may be used in the present invention.

HSI is modeled with cylindrical coordinates. One possible model comprises the double cone model, i.e., two cones placed end to end or an inverted cone below another cone. For information on the double cone model, see Randy Crane, "A Simplified Approach to Image Processing," Prentice Hall, 1997. The hue is represented as the angle theta, varying from 0° to 360°. Saturation corresponds to the radius or radial distance, varying from 0 to 1. Intensity varies along the z-axis with 0 being black and 1 being white. When S=0, the color is gray scale, with intensity I, and H is undefined. When S=1, the color is on the boundary of the top cone base and is fully saturated. When I=0, the color is black and therefore H is undefined.

Another color space is informally referred to as "Lab" color space, but is more formally designated as CIELAB (or CIE L*a*b*) and a related "Lab" color space, "Hunter L, a, b." "Lab" color spaces are conventional and well-known, and therefore will not be described in any detail. Of particular note, unlike RGB and CMY, "Lab" color spaces were created to serve as a device-independent color model to be used as a reference. The three parameters in the "Lab" spaces represent the lightness of a color ("L*," L*=0 yields black and L*=100 indicates white), its position between magenta and green ("a*," negative values indicate green, positive values indicate magenta), and its position between yellow and blue ("b*," negative values indicate blue and positive values indicate yellow).

On the assumption that the R, G and B values have been normalized to range from 0 to 1 (which is conventional), the following equations may be used to convert from RGB color space to HSI (or HSL) color space:

$$H = \cos^{-1}_{0.5} \{(\frac{1}{2}[(R-G)+(R-B)]/([R-G]^2+[R-B][G-B])$$

$$S = 1 - [3/(R+G+B)][\min(R,G,B)]$$

$$I = (R+G+B)/3$$

The Intensity I (or Luminance L) may also be represented by the equation:

$$L = 0.299R + 0.587G + 0.114B$$

which is a weighted sum of the RGB values.

The equation for H yields values in the interval [0° to 180°]. If B/I>G/I then H is greater than 180° and is obtained as H=360°−H.

Prior art in color machine vision systems use various techniques to measure and match colors. Those skilled in the art will be familiar with "thresholding" an image. To threshold a color image, a threshold is applied to each of the three planes that make up the image. In RGB mode, to select a particular color, one will need to know the red, green and blue values that make up the color. In RGB mode it is not possible to separate color from intensity. Therefore, a characterization algorithm such as histogram intersection based on RGB space will be intensity sensitive. For more information on this, please see Michael J. Swain, "Color Indexing," *International Journal of Computer Vision*, vol. 7:1, page 11-32, 1991.

Prior art color matching techniques commonly calculate the color difference between corresponding pixels of a target object and a template object. These prior art techniques generally perform pixel-by-pixel comparisons or subtractions between pixels of the target object and pixels of the template object. The results of these pixel-by-pixel comparisons may then be compiled to determine the level of color similarity between the entire target object and template object. The computation cost of pixel-by-pixel comparison is very expensive and is difficult to accomplish in real time. A more efficient color match method is desirable. More specifically, it is desirable to enable machine vision applications to more effectively characterize and compare the colors in images.

U.S. Pat. No. 5,085,325 (Jones) describes a color sorting system and method. The method creates a lookup table containing a series of 0's (accept) and 1's (reject) based on good and bad sample images. During the sorting process, the pixel value of the input image is used to address the lookup table, the output of the lookup table is either 1 or 0. If the number of rejects (1's) accumulated is larger than a specified number K, the input image is rejected. This color sorting method is based on a pixel-by-pixel comparison. A large memory is required to store the lookup table. Although a special hardware addressing approach can improve the processing speed, the cost of computation is still very high for sorting objects with complex colors.

U.S. Pat. No. 5,751,450 (Robinson) provides a method for measuring the color difference of two digital images as a single "distance." This "distance" is an average of the color differences of all corresponding pixels of the two images. The cost of computing the "distance", however, is very high. This template image has to be stored in the computer memory for on-line color matching. If the size of the template and target image are not the same, special operations for alignment or resizing the image must be done before the matching process can begin. A further drawback of this approach is that it is impossible to have scale and rotation-invariant color matching based on the "distance" measure. See also U.S. Pat. No. 6,963,425.

SUMMARY OF THE INVENTION

The present invention, rather than using a spectrophotometer, utilizes a conventional digital camera to accomplish a color match, using nothing more than a color wheel of known color values (e.g., RGB values, CMY values, CMYK values, or HSL/HSI values).

In the present invention, a color wheel of known color values, preferably at least eight (8) colors spread evenly across the entire spectrum of visible colors, more preferably at least 16 colors, and more preferably still at least 32 colors (spread across the visible spectrum) is placed next to the target color to be matched (e.g. a wall or other surface). A digital image is then taken of the color wheel and the target color. This digital image can be taken with a digital still camera or a digital camcorder.

The digitized image of the color wheel and target color is then uploaded to a computer that is programmed to compare the known colors within the target wheel to the target color. The comparison can be accomplished using any known color space system (such as those noted above). The target color is derived by first comparing the known HSI values (or RGB values or CMY values) of the color wheel to the target color. The target color is bracketed between the two closest colors contained on the color wheel. That is, using the HSL color space as an example, the known H, S, and L values of the color wheel are compared to the digitized image of the target color. By comparing the known HSL values of the color wheel to the digitized image of the target color, the corresponding HSL values of the target color can be determined by means of comparing the distance the target color lies between two of the known colors on the color wheel.

The computational effort required to find a color match is decreased by using a color wheel having more colors. Using more known colors provides an initial color space comparison that is necessarily closer to the target color. The comparator algorithm then needs to compare only the closest known color from the color wheel to the target color to formulate a set of color coordinates that matches the target color.

In addition to different colors, the color wheel may also include areas of different luminosity, such as flat, egg shell, satin, semi-gloss, and hi-gloss. In this fashion, not only can the present invention match the color, it can also match the sheen or luminosity of the target color.

The same approach can be used to correct the color of a computer display. Again, a color wheel of known color values is used. Here, a first digital image of the color wheel is taken and uploaded to the computer. The digital image of the color wheel is then displayed on the computer monitor. Then a second digital image of the computer monitor displaying the image of the color wheel is taken. If the color monitor is displaying colors accurately, the image displayed on the computer monitor and the second image, should both match with the color wheel. By analyzing the second image pixel-by-pixel, and comparing the color values of the pixels to the known color values of the color wheel, the computer monitor can be adjusted accordingly to display true colors.

Thus, a first version of the invention is directed to a method to define automatically, in a pre-selected color space, at least one user-provided sample color. The method comprises defining mathematically within a programmable computer at least one target color within the color space to yield a standard color data set; providing a physical color swatch corresponding to the at least one target color defined in step (a); and providing a digitized image comprising the at least one user-provided sample color juxtaposed with the physical color swatch, to yield a sample color data set. Then, the sample color data set is compared to the standard color data set by means of a program stored on the programmable computer to thereby determine a set of coordinates within the color space that defines the user-provided sample color.

The target color can be defined within any color space now known or developed in the future, including, without limitation, a color space selected from the group consisting of RGB, CMY, CMYK, HSV, HSI, and L*a*b*. The color spaces RGB, CMYK, and HSV are generally preferred.

The digitized images to be provided in a digital format are preferably taken using a consumer-type digital camera, and can be rendered in any digital format now known or developed in the future. The JPEG and RAW digital image formats are preferred. These formats are exceedingly well known and implemented in a host of commercially available digital cameras. These formats will not be described in any detail herein.

In comparing the data sets, it is preferred that the sample color data set be compared to the standard color data set by determining a minimum mathematical distance between the standard color set and the sample color data set. The standard color data set having the minimum mathematical distance from the sample color data set is then deemed to be the set of coordinates within the color space that defines the user-provided sample color. The minimum mathematical distance can be determined using any suitable metric, such as (without limitation) a Euclidean metric, a taxicab metric, or a Chebyshev metric.

The method can also be used to match patterns, in which case the sample colors are analyzed using a clustering algorithm to identify the pattern and the individual colors within the pattern. While any suitable clustering algorithm may be used, a fuzzy c-means clustering algorithm is generally preferred.

Another version of the invention is directed to a related method comprising defining mathematically within a programmable computer at least one target color within the color space to yield a standard color data set; providing a physical color swatch corresponding to the at least one target color defined earlier; and providing a digitized image comprising the at least one user-provided sample color juxtaposed with the physical color swatch, to yield a sample color data set, as noted earlier. Then, the sample color data set is compared to the standard color data set by determining a minimum mathematical distance between the standard color set and the sample color data set, and wherein the standard color data set having the minimum mathematical distance from the sample color data set is deemed to be the set of coordinates within the color space that defines the user-provided sample color.

Yet another version of the invention is a method to define automatically, in a pre-selected color space, at least one user-provided sample color. Here, the method comprises defining mathematically within a programmable computer a plurality of distinct target colors within the color space, wherein each distinct target color occupies a unique location in an virtual array, to yield a standard color data set; providing a physical color swatch comprising a physical array corresponding to the virtual array defined earlier, and further wherein the physical array includes a unique void array location; and providing a digitized image of the user-provided sample color inserted into the physical array, wherein the user-provided sample color occupies the void array location within the physical array to yield a sample color data set. Then, the sample color data set is compared to the standard color data by determining a minimum mathematical distance between the standard color set and the sample color data set, and wherein the standard color data set having the minimum mathematical distance from the sample color data set is deemed to be the set of coordinates within the color space that defines the user-provided sample color.

Any of the above-described versions of the inventions can also be implemented by defining a plurality of distinct target colors within the color space, wherein each distinct target color occupies a unique location in an virtual array. When the data is arranged in this fashion, a physical color swatch is provided that comprising a physical array corresponding to the virtual array, and further wherein the physical array includes a unique void array location (a literal hole in the physical array). In this fashion, the digitized image of the user-provided sample color can be provided by inserting the user-provided sample color into the void array location by physically placing the array onto the item whose color is to be sampled and analyzed, and taking a digital picture of the physical array disposed on the item.

DETAILED DESCRIPTION OF THE INVENTION

The crux of the invention is defining mathematically within a programmable computer at least one target color (and preferably a large plurality of target colors) within a color space to yield a standard color data set. In essence the physical perception of "color" is reduced to a set of numeric values. Any color, texture, palette, hue, etc. can be defined using any of the color spaces discussed hereinabove.

To determine the values that will constitute the standard color data set, items of the desired colors (walls, furniture, drapes, carpets, etc.) are digitally imaged (with a digital camera or scanner or other color measure device) under controlled lighting conditions and defined device conditions. This numeric data contains a control color grid so that the numeric values that define any given "color" within the standard color data set can be normalized. The normalized color(s) are stored within the sample color data set for future matching, as described herein.

The problem with color matching, of course, is that the display of a digital camera does not render the true color of an object. Thus, it is impossible simply to take a digital photograph of an item to be color-matched (say a bedroom wall), and then take the digital camera to the hardware store and ask them to match the color as it appears on the display of the digital camera. The results would be a disaster.

But, by comparing the digital data contained within such an image to a normalized, standardized database of color values, an accurate color match can be attained by mathematically comparing the digital color values for the unknown sample and at least one (and preferably a plurality) of known color swatches as those data are generated by the user's own digital camera. That is, a physical swatch containing colors of known, normalized, and standardized color values (that is, a physical swatch containing colors that correspond to the standard color data set) is photographed in juxtaposition to the unknown sample that is to be color matched. The mathematical differences between the unknown sample color and the known color values that correspond to the physical color swatches can then be used as a basis to find a set of color coordinates within the selected color space that match the sample color.

Figure 6:
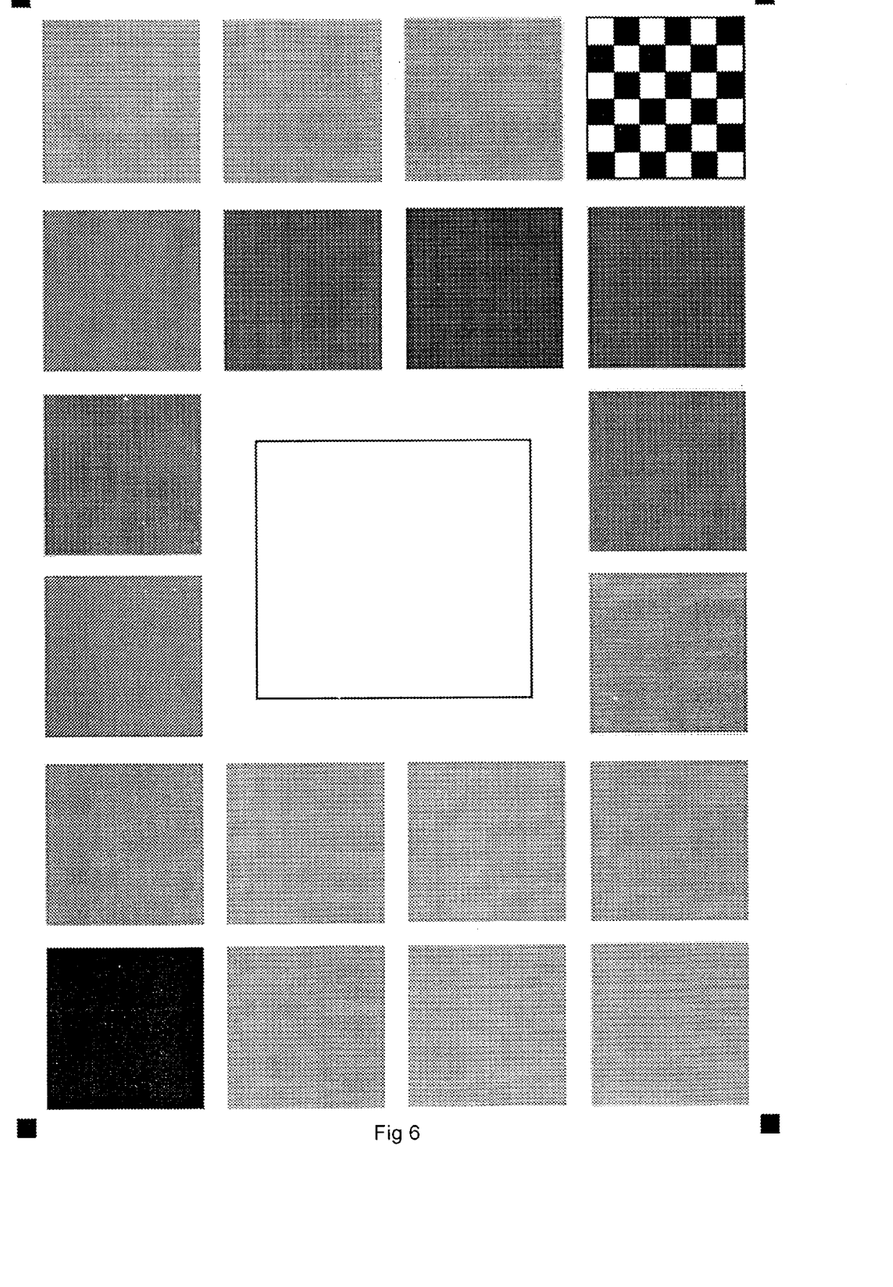
FIG. 6 is an example of a physical color swatch (rendered in black-and-white) in the form of an array. The void in the center is where the sample color is to be inserted.

The physical color swatch or array that corresponds to the at least one target colors defined in the standard color data set preferably comprises a regular array of different colors. An exemplary array is shown in FIG. 6. As shown in FIG. 6, the array comprises a lattice of squares of different colors (grey scale for purposes of FIG. 6). The specific colors are preferably chosen so that they span the dynamic range of the user's camera, as well as the dynamic visual range of the color space selected (for example, values of R, G, and B that span the entire range of these values). The specific colors can be chosen in multiple ways, all of which are essentially arbitrary. There is no optimal color set from a scientific or mathematical standpoint. However, for purposes of marketing and design, it might be helpful to group the arrays by color groups or themes (e.g., "reds," "blues," "warm tones," "cold tones," "earth tones," etc.). As depicted in FIG. 6, the center of the array defines a void, which is indicated in FIG. 6 by the square black outline in the center of the figure.

In the preferred version of the invention, each unique array will include a unique identifier in one of the lattice squares (depicted as the "checkerboard" array location in FIG. 6). This identifier is machine readable using any form, format or code now known or developed in the future. Conventional UPC is suitable. The identified is used to link each unique series of physical arrays produced to a matching standard color data set that corresponds to that particular array. The identifier is an important component of the array to guarantee the quality of the color match. Because professional printing techniques do not always yield identical colors from print run to print run (due to inexact ink and pigment formulations, variations in the paper and the presses, etc), each print run of an array includes a machine-readable identifier unique to that series (even if the colors are ostensibly the same in the different runs). The colors from each array are then measured under controlled conditions and the color coordinates for each unique location in the array is stored electronically (as the standard color data set) to be used to calibrate the color(s) in the user's image.

The samples to be matched are analyzed via a digital image from a consumer quality digital camera. The digital image of the sample to be matched is juxtaposed with the physical color swatch (e.g., the physical array depicted in FIG. 6), preferably with the array affixed flush to the item to be color-matched. For purposes of automation, the computer doing the analysis can be programmed to designate that the sample to be color-matched is whatever color appears in the hole in the center of the grid as shown in FIG. 6. (Note that FIG. 6 is merely for purposes of illustration. The array can take any geometric configuration, without limitation, and can include as few as two array locations (one location for a standard color and one location for the sample color) or as many locations as practical within the constrains of space and user-friendliness.) There is no specific requirement on overall image size in terms of an upper limit (but again, practical concerns will intercede), but each unique array location should have a minimum dimensions in pixels to ensure that the sample color is captured accurately by the camera. If the sample color and the standard colors are too small in the image, the process will yield less-than-ideal results because the mathematical computations will proceed with a very small starting set of data. While not being limited to any particular lower limit, each array location should generally be about 800 pixels wide in the image taken. When using conventional, consumer digital cameras, the images should be taken in 24 bit un-indexed color, using any digital format now known or developed in the future. (JPEG and RAW formats are preferred.)

The lighting conditions under which the user snaps the photograph of the sample to be color-matched and the standard color swatches is also very important to ensure an accurate color match. The images should display the sample to be color-matched is in its normal lighting conditions, i.e. the image should be taken in the location where the color-matched item will ultimately be situated (e.g., in the user's residence or office, etc.), and under normal lighting conditions. The image should not include any light sources within the item to be color-matched, or near enough to the item to cause a significant light gradient. Also, there cannot be any shadows cast across the physical color swatch array itself; the swatch array should be in ambient light only, under as uniform lighting conditions as possible. In practice, small light gradients are unavoidable and are usually not readily discernable by the untrained human eye.

The digital image of the swatch array juxtaposed with the item to be color-matched is then compared, by means of a programmable computer, to the standard color data set to identify a set of color coordinates that match or closely approximate the sample color. The program first locates the physical color swatch array within the image. Finding the array within the image is accomplished using well-documented digital image processing techniques that are in the public domain. After the physical color swatch array is found within the image, each of the unique locations in the array are examined to determine effective "average" color of each unique array location. The machine-readable location is also read at this point to determine the array series so that the particular array depicted in the digital photo can be matched with the appropriate standard color data set for that array.

Based on the control colors for the array series, and the colors actually reported from the user's image, a set of "color transformation" functions are created for the image being processed. The purpose of these functions is to transform (or map) the numeric color values as contained in the user's image into the numeric color values that are contained in the corresponding standard color data set for that particular array. These are transformations from the user-generated image (as RGB or HSV, or some other color space), into the standard color data set values (as recorded in the same color space). The color transformation functions can be accomplished using any of a number of curve-fitting mathematical functions, including linear regression, piecewise linear regression, splining, and the like.

The physical color swatch array as shown in FIG. 6 includes a void in which appears the sample color to be matched. Analyzing this section of the user's image is the next stage of processing. At this point in the program, the process diverges depending on whether a solid sample color is being matched or a multi-colored or patterned sample is being matched. The program may also contain sub-routines that allow the user to specify what type of material is being color-matched, e.g., fabrics, carpet, painted surfaces, brick, tile, and the like. For example if the user is interacting with a system or sub-system used for stone tile comparisons and is given the opportunity to analyze an image, then the context is clearly stone tile comparisons (multi-color matching). In the context of such a sub-system, the colors within the physical color swatch array may be constrained to span only the dynamic range of the types of items to be analyzed, instead of the full-color gamut of digital cameras.

For single color matching, the pixels in the sample are examined and a normalized "average" color is determined. For purposes of brevity, the following discussion refers to the RGB color space. This is for example only. The calculations proceed in an analogous fashion if an alternate color space is selected. To calculate the normalized average, each pixel color is read from the image and its color is converted for each RGB coordinate according to the color transformations created from comparing the array colors in the image to the known standard color data set that correspond to the physical color swatch array in the image. From all of these converted pixel colors an average of all of the pixels is calculated as the arithmetic mean.

The normalized sample color is then compared to the standard color data set to find the closest match or matches. To determine the color coordinates that most closely match the sample color, various similarity measures (mathematical operations) can be used to analyze the data. Regardless of the method chosen, they all share one common feature, which is the calculation of a mathematical distance measure between the sample color and each control color within the standard color data set that is considered. The distance measure is preferably expressed as a single numeric value, wherein the smaller the distance measurement, the closer the color match. The color coordinates within the standard color data set are then sorted by their respective distance measures to the sample color, and the coordinates that are closest (i.e., have the smallest distance value) from the sample coordinates are deemed to be the best color matches.

For the RGB measures below, it is assumed that the range of valid values for the R, G, and B channels are all the same as one another. For the RGB space, the conventional range for each coordinate is either [0, 255] or [0, 1]. Either range works equally well. As long as all three coordinates (R, G, and B) have the same value ranges, each coordinate contributes equally to the weighting.

The simplest distance measure considers the RGB values of the sample color and one control color, and the distance is calculated as the sum of the differences of each channel respectively. (This type of distance measure is known as a "Taxicab metric" or "Manhattan distance" and treats the R, G, and B, values in the same fashion as if they were spatial coordinates in Cartesian graph.) Thus, the sample color RGB values are designated R[s], G[s], and B[s], and the standard color data set RGB values are designated R[c], G[c], and S[c], then this distance measure is:

$$\text{Distance} = |R[s] - R[c]| + |G[s] - G[c]| + |B[s] - B[c]|.$$

The Chebyshev metric distance (also known as the chess distance because of its relationship to how a king moves in the game of chess) will also yield distance results similar to the taxicab metric. Chebychev distance measures the greatest of the differences between two points along any coordinate dimension.

Rather than a taxicab metric or a Chebycheve metric, the Euclidian distance between the sample color and one or more color coordinates of the standard color data set may also be used. (Again, this approach treats RGB space as a Euclidian space; R, G, and B, are treated in the same fashion as the Cartesian coordinates X, Y, and Z.) This measure is defined as:

$$\text{Distance} = [(R[s] - R[c])^2 + (G[s] - G[c])^2 + (B[s] - B[c])^2]^{(1/2)}.$$

In the HSV color space, the distance may also be calculated using a weighting vector on the differences of the HSV values between the sample color and the control colors in the standard color data set. The standard HSV model uses a cylindrical coordinate system as opposed to the more common Euclidean (square) coordinates, so range normalization must be performed to obtain an appropriate distance measure. In the present invention, an HSV representation that allows the H (hue) values to range is [0, 360) (degrees); the S (saturation/vibrancy) and V (value/brightness) values range is [0, 1] can be used. These ranges are first normalized so they are all represented as values in [0, 100]. Thus, the range-normalized control color values are designated H[c], S[c], and V[c]; and the range-normalized sample colors values are designated H[s], S[s], and V[s]. The differences between the control and sample values for each value of H, S, and V can then be calculated as follows:

$$H\text{-delta} = |H[c] - H[s]|$$

$$S\text{-delta} = |S[c] - S[s]|$$

$$V\text{-delta} = |V[c] - V[s]|$$

While the HSV color representation is more intuitive in terms of how humans actually perceive color, each of the channels in HSV space contributes a different amount to color perception. The weighting vector is then used to calculate the final distance by placing a greater weight on hue, which is the primary perception made by the human eye and brain. This causes the different coordinates (H, S, and V) to count for different relative amounts in the distance measure. For example, to get the hue to count most and the saturation to count the least, a weighting vector of (10, 1, 5) is an appropriate weighting, and yields a distance measure of:

Distance=10*H-delta+1*S-delta+5*V-delta

Regardless of whether weighting is used or omitted (and both approaches are included in the present invention), the smallest distance measured is deemed to be the best color match.

When a multi-colored item is analyzed, the process of determining the "effective" colors is the same whether the analysis is for a control item, or a user image. Each pixel is normalized according to the color transformation functions in the same way as for single color analysis. But instead of determining a single average color, the normalized colors are "clustered" into a predefined number of representative colors. Any suitable clustering algorithm can be used; fuzzy c-means clustering is preferred. Other clustering algorithms or other variants on the fuzzy c-means clustering will yield similar results that can be interpreted similarly. If the item being analyzed is a control item, that is, the standard color data set itself is made from a collection of patterned physical color swatches, the list of most predominant colors is stored electronically and associated with the control item that was analyzed.

By way of an example, assume that the item to be color-matched included five main colors. The clustering would likewise be arranged to determine and compare the five most representative colors in the sample item to be color-matched. For a given sample item, assume that the representative RGB color vectors are:

<246, 191, 121>
<239, 182, 111>
<228, 171, 99>
<255, 207, 144>
<251, 198, 132>

This list of sample color coordinates it then to be compared with a standard color data set comprising the following list of color coordinate:

<235, 177, 106>
<249, 193, 121>
<246, 188, 116>
<241, 184, 111>
<254, 197, 128>

In the same fashion as single color matching, a distance measure is calculated between the sample color coordinate data and the standard color data set. One way to calculate these distance measures, is to pair the sample and control colors are and calculate a single color distance for each pairing. The overall distance measure is the average (arithmetic mean) of the individual distance measures. However, there are multiple ways to pair up the colors between the sample and control item. So, the pairing that yields the smallest distance measure is the best match, and is used as the distance measure between the control and sample.

Thus, for example, if the two data sets listed above are paired in the order listed above, and their differences calculated, the following results are obtained:

| | | |
|---|---|---|
| <246, 191, 121> | <235, 177, 106> | distance~= 23.28 |
| <239, 182, 111> | <249, 193, 121> | distance~= 17.91 |
| <228, 171, 99> | <246, 188, 116> | distance~= 26.49 |
| <255, 207, 144> | <241, 184, 111> | distance~= 42.59 |
| <251, 198, 132> | <254, 197, 128> | distance~= 5.099 |

The average of those distances ~=23.07

But this is only one possible pairing of the colors between the control and sample item. Other pairings may have better distance measures, so other pairings need to be evaluated. The following is the best pairing for these data:

| | | |
|---|---|---|
| <246, 191, 121> | <246, 188, 116> | distance~= 5.83 |
| <239, 182, 111> | <241, 184, 111> | distance~= 2.82 |
| <228, 171, 99> | <235, 177, 106> | distance~= 11.57 |
| <255, 207, 144> | <254, 197, 128> | distance~= 18.89 |
| <251, 198, 132> | <249, 193, 121> | distance~= 12.24 |

The average of those distances ~=10.27.

Regarding clustering, optimizing the clustering function yields better results with less computation time invested. Fuzzy c-means (FCM) is a method of clustering which allows one piece of data to belong to two or more clusters (i.e. on or more colors within the pattern between analyzed). (See J. C. Dunn (1973): "A Fuzzy Relative of the ISODATA Process and Its Use in Detecting Compact Well-Separated Clusters," *Journal of Cybernetics* 3:32-57; and J. C. Bezdek (1981): "Pattern Recognition with Fuzzy Objective Function Algoritms," Plenum Press, New York.) Fuzzy c-means clustering is frequently used in pattern recognition. It is based on minimization of the following objective function:

$$J_m = \sum_{i=1}^{N} \sum_{j=1}^{C} u_{ij}^m \|x_i - c_j\|^2, \ 1 \le m < \infty$$

where m is any real number greater than 1, uij is the degree of membership of xi in the cluster j, xi is the ith of d-dimensional measured data, cj is the d-dimension center of the cluster, and ||*|| is any norm expressing the similarity between any measured data and the center.

Fuzzy partitioning is carried out through an iterative optimization of the objective function shown above, with the update of membership $u_{ij}$ and the cluster centers $c_j$ by:

$$u_{ij} = \frac{1}{\sum_{k=1}^{C} \left(\frac{\|x_i - c_j\|}{\|x_i - c_k\|}\right)^{\frac{2}{m-1}}}, \ c_j = \frac{\sum_{i=1}^{N} u_{ij}^m \cdot x_2}{\sum_{i=1}^{N} u_{ij}^m}$$

This iteration will stop when $\max_{ij}\{|u_{ij}^{(k+1)} - u_{ij}^{(k)}|\} < \epsilon$, where ε is a termination criterion between 0 and 1, whereas k are the iteration steps. This procedure converges to a local minimum or a saddle point of $J_m$.

The algorithm comprises the following steps:

1. Initialize $U = [u_{ij}]$ matrix, $U^{(0)}$

2. At $k$-step: calculate the centers vectors $C^{(k)} = [c_j]$ with $U^{(k)}$ $$c_j = \frac{\sum_{i=1}^{N} u_{ij}^m \cdot x_2}{\sum_{i=1}^{N} u_{ij}^m}$$

-continued

3. Update $U^{(k)}, U^{(k+1)}$ $$u_{ij} = \frac{1}{\sum_{k=1}^{C} \left(\frac{\|x_i - c_j\|}{\|x_i - c_k\|}\right)^{\frac{2}{m-1}}}$$

4. If $\|U^{(k+1)} - U^{(k)}\| < \varepsilon$ then STOP; otherwise return to step 2.

Note, however, that the clustering process is only used when the user sample (the unknown to be matched) contains multiple colors, regardless of whether the physical swatch array contains multiple colors. The clustering is used to reduce the number of colors in the user sample down to a small number of colors, which is more meaningful (and feasible to process). Wood-grained finishes are a perfect example. When visually examining a wooden surface, there appears to be only a few colors within the grain. But in a digital image of stained wood, there are hundreds or even thousands of different RGB values reported across the entire length and width of the pixelated image. This is a result of many factors of digital imaging. But also, the human eye and brain together detect many, many colors, but perceptually reduces the number of colors "seen" down to a few colors. By using a clustering algorightm, the multitude of colors in the digital image can be made to be close to the few colors that human visual systems actually perceives in practice. Thus, the clustering algorithm is used to reduce the colors in the image down to the few "most predominant" colors within the digital sample image.

In the process of producing the standard color data sets, items such as wood, stone tiles, carpeting, etc. are sampled. When these are sampled, their colors are also run thru the clustering process to determine the most predominant colors for purposes of running the matching algorithm.

Thus, when an attempt is made to find a best match for a multi-colored sample, all of the colors from the clustering of the user sample are compared against all of the colors in each multi-colored standard color data set. Given a particular (multi-colored) control item to compare to the user's sample to be color-matched, the individual colors are paired up in every possible manner and distance measures are taken for each pairing, i.e. each pairing is measured in the same fashion as when matching single colors. The smallest average (or equivalently total) distance from among all the possible pairings is then deemed to be the *difference* between the sample and control item and is chosen as the closest match. The sample is compared in this manner against every multi-color control item, and the control item that has the smallest difference considered the best match. Using this approach for matching against multi-colored samples, the clustering is a preprocessing step to create a tractable comparison problem.

Figure 1:
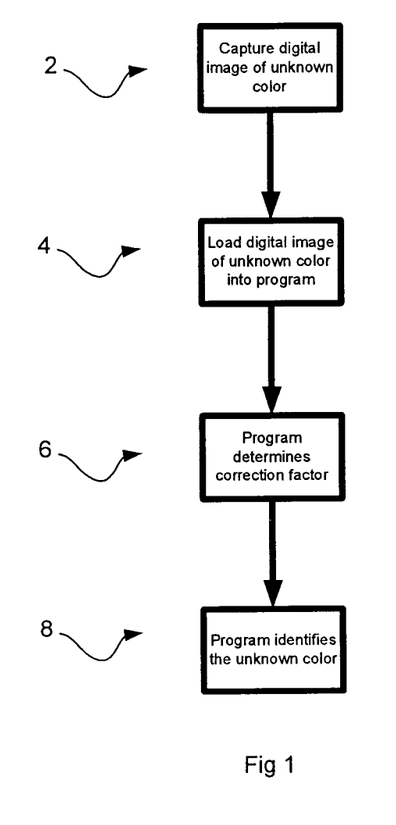
FIG. 1 provides an overview of the process of taking the digital image of the unknown color through color identification.

FIG. 1 illustrates how the method involves identifying an unknown color using a digital image containing said unknown color (hereinafter referred to as the image) and a color template to generate a correction factor.

The user takes the image using any available means 2, typically with a digital camera. The image is then loaded into a computer where the image interfaces with the program 4. The image might not depict the color precisely enough for the program to identify without further preparation due to various factors such as lighting and quality of the camera. The program compensates for these factors by calibrating the image against a known standard to create a correction factor 6. The program then uses the correction factor along with the image to determine a particular color in the image based on information stored in the program 8.

One embodiment of the method addresses the issue of color identification by referencing another known color in the digital image. The digital image generally will contain more than one color. With different colors, the program determines a relationship between the known and unknown colors in the digital image.

The relationship between a known color and an unknown color allows the program to find the difference between them. These differences based on the properties of the colors allow the program to quantify the differences in color. The comparisons utilized in the program use any previously mentioned color space system or those known to persons skilled in the art. The unknown color is then placed between the two closest known colors available. The unknown color is then identified by comparing the distance between the two known colors with respect to the unknown color.

Figure 2:
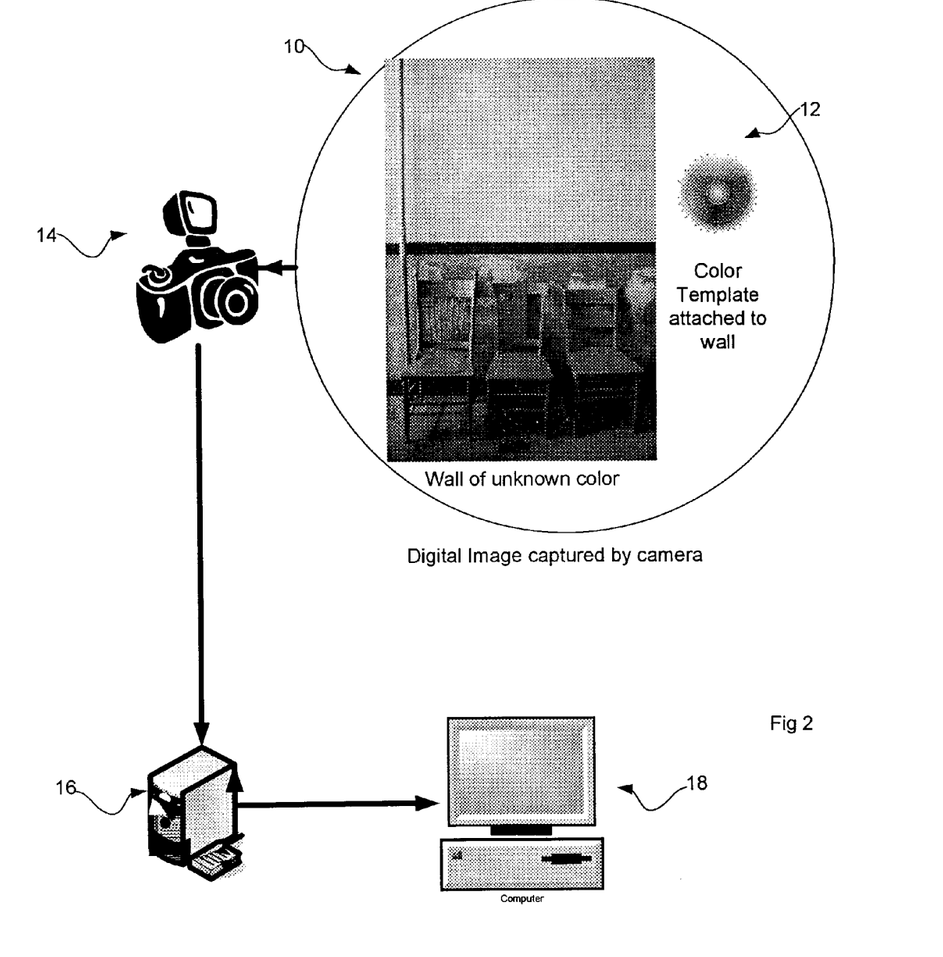
FIG. 2 shows a pictograph of an embodiment of the process in the FIG. 1.

One embodiment of the disclosed subject matter addresses the known color standards by providing the user with a color template that contains a series of known colors the program can use as a reference. The user uses the color template by having it appear in the image when the image is taken as FIG. 2 illustrates. The user takes a digital image with both the unknown color and the color template to aid in color identification 12. The image is taken by the camera 14 and transferred to the interface 16 which then displays the results of the color identification on the display 18. The more colors available on the color template, the less effort required to determine the color since the differences between the known and unknown colors will be smaller.

Figure 3:
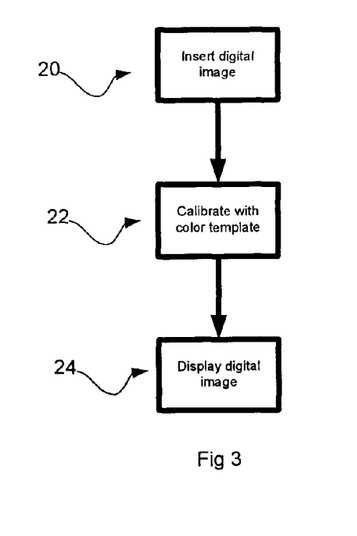
FIG. 3 shows how the program uses the color template to compare against the unknown color for further analysis.

FIG. 3 illustrates how the color template aids in calibration. As previously mentioned, the digital image might not be a completely accurate representation of the unknown color. The color template represents known color values. After the digital image with the unknown color and the color template is inserted into the interface 20, the program calculates the correction factor by comparing the color template values in the image against the known color template standards 22. The program uses this correction factor for the display and analysis of the unknown color 24.

Figure 4:
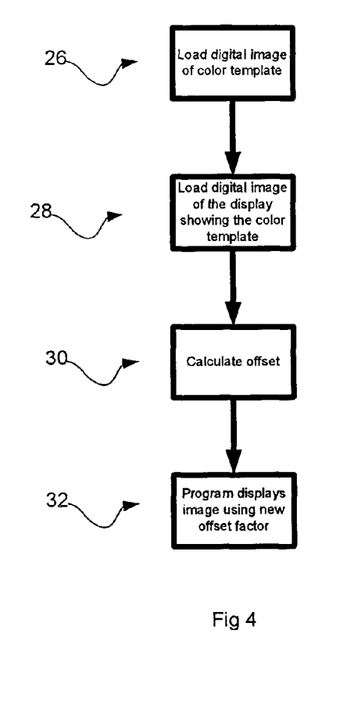
FIG. 4 shows how the program calibrates the display in order to accurately represent colors.

Another problem solved by the present disclosure involves possible color misrepresentation via the interface as shown in FIG. 4 The present disclosure allows a way to calibrate the display to effectively show the true color represented in the image regardless of factors that could cause the display to distort the color provided by the image. This method compensates for misrepresentations in the display by taking a calibration image of the display 26 and supplying the calibration image to the program 28.

Figure 5:
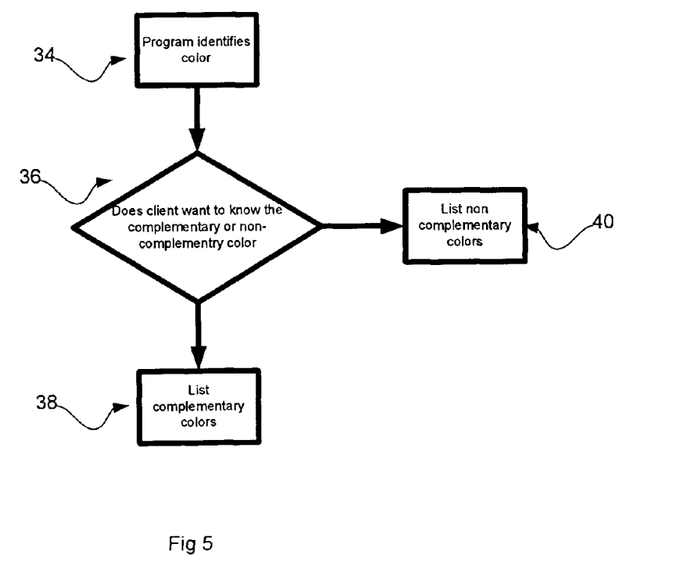
FIG. 5 shows the process providing the user with a list of colors based on an identified color.

An option available to users once the color has been identified allows the user to coordinate colors in relation to the previously unknown color as shown in FIG. 5. Once the program identifies the color 34, the client can choose 36 to view a list of complimentary 38 or non complementary colors 40 in comparison to the identified color.

Flash photography also influences how a color appears in a digital image. Typical cameras use a flash device to illuminate the area recorded. The flash can cause the image recorded to not accurately represent the color under normal conditions. The correction factor generated by the program takes that into account by comparing the effect of the flash on the unknown color to the effect of the flash on the color template.

What is claimed is:

1. A method to define automatically, in a pre-selected color space, at least one user-provided sample color, the method comprising:

(a) defining mathematically within a programmable computer each of a plurality of target colors with coordinates within the color space to yield a standard color data set;

(b) providing a multi-chromatic physical color swatch comprising a plurality of swatch colors spanning at least a portion of the color space, wherein each of the plurality of swatch colors corresponds to one of the plurality of target colors defined in step (a) by being defined within the color space with the coordinates defining the one of the plurality of target colors;

(c) digitally imaging a plurality of user-provided sample colors juxtaposed with the multi-chromatic physical color swatch to provide a plurality of digitally imaged user-provided sample colors juxtaposed to a digitally imaged plurality of swatch colors, thereby yielding a sample color data set comprising coordinates within the color space defining the digitally imaged user-provided sample colors and each of the digitally imaged plurality of swatch colors; and then (d) comparing the coordinates in the sample color data set of step (c) with the coordinates in the standard color data set of step (a) by means of a program comprising a clustering algorithm stored on the programmable computer to thereby determine coordinates within the color space that defines at least one of the user-provided sample colors, wherein the clustering algorithm clusters the plurality of digitally imaged user-provided sample colors into a predefined number of representative colors, and wherein the comparing comprises comparing coordinates defining each of the representative colors against the coordinates defining each of the target colors in the standard color data set.

2. The method of claim 1, wherein the physical color swatch comprises a physical array and the physical array comprises:

a hole therein, and wherein the digitally imaging in step (c) comprises placing the physical array on an item comprising the user-provided sample color such that the user-provided sample color is visible through the hole; and digitally imaging the physical array with the user-provided sample color visible through the hole in the physical array.

3. The method of claim 1, wherein the digitally imaging in step (c) comprises photographing the physical color swatch in juxtaposition with the user-provided sample color.

4. The method of claim 3, wherein the plurality of swatch colors in the physical color swatch span a dynamic range of a camera used in the photographing.

5. The method of claim 1, wherein in step (d), the clustering algorithm is a fuzzy c-means clustering algorithm.

6. The method of claim 1, wherein step (d) comprises:

transforming the sample color data set of step (c) with respect to the standard color data set of step (a) to yield a transformed sample color data set, and then clustering the digitally imaged user-provided sample colors in the transformed sample color data set into the pre-determined number of representative colors; and determining a minimum mathematical distance between coordinates in the standard color data set and coordinates defining a transformed user-provided sample color in the transformed and clustered sample color data set, wherein the minimum mathematical distance determines the coordinates within the color space that defines the at least one user-provided sample color.

7. The method of claim 6, wherein the minimum mathematical distance is determined using a metric selected from a Euclidean metric, a taxicab metric, or a Chebyshev metric.

8. The method of claim 1, wherein the plurality of swatch colors in the physical color swatch are spread evenly across an entire spectrum of visible colors.

9. The method of claim 1, wherein the providing the physical color swatch in step (b) comprises providing a plurality of physical arrays, wherein each of the plurality of the physical arrays comprises an identifier, and wherein a subset of the identifiers links a subset of the plurality of the physical arrays to the standard color data set of step (a).

10. A method to define automatically, in a pre-selected color space, at least one user-provided sample color, the method comprising:

(a) defining mathematically within a programmable computer each of a plurality of target colors with coordinates within the color space to yield a standard color data set;

(b) providing a multi-chromatic physical color swatch comprising a plurality of swatch colors spanning at least a portion of the color space, wherein each of the plurality of swatch colors corresponds to one of the plurality of target colors defined in step (a) by being defined within the color space with the coordinates defining the one of the plurality of target colors;

(c) digitally imaging a plurality of user-provided sample colors juxtaposed with the multi-chromatic physical color swatch to provide a plurality of digitally imaged user-provided sample colors juxtaposed to a digitally imaged plurality of swatch colors, thereby yielding a sample color data set comprising coordinates within the color space defining the digitally imaged user-provided sample color and each of the digitally imaged plurality of swatch colors; and then (d) comparing the coordinates in the sample color data set of step (c) with the coordinates in the standard color data set of step (a) by means of a program comprising a clustering algorithm stored on the programmable computer to thereby determine coordinates within the color space that defines at least one of the user-provided sample colors, wherein the clustering algorithm clusters the plurality of digitally imaged user-provided sample colors into a predefined number of representative colors, and wherein the comparing comprises pairing coordinates defining each of the representative colors with the coordinates in the standard color data set in every possible manner and determining a distance measure for each pairing.

11. The method of claim 10, wherein the physical color swatch comprises a physical array and the physical array comprises:

a hole therein, and wherein the digitally imaging in step (c) comprises placing the physical array on an item comprising the user-provided sample color such that the user-provided sample color is visible through the hole; and digitally imaging the physical array with the user-provided sample color visible through the hole in the physical array.

12. The method of claim 10, wherein the digitally imaging in step (c) comprises photographing the physical color swatch in juxtaposition with the user-provided sample color.

13. The method of claim 12, wherein the plurality of swatch colors in the physical color swatch span a dynamic range of a camera used in the photographing.

14. The method of claim 10, wherein in step (d), the clustering algorithm is a fuzzy c-means clustering algorithm.

15. The method of claim 10, wherein step (d) comprises:
transforming the sample color data set of step (c) with respect to the standard color data set of step (a) to yield a transformed sample color data set, and then clustering the digitally imaged user-provided sample colors in the transformed sample color data set into the pre-determined number of representative colors; and determining a minimum mathematical distance between coordinates in the standard color data set and coordinates defining a transformed user-provided sample color in the transformed and clustered sample color data set, wherein the minimum mathematical distance determines the coordinates within the color space that defines the at least one user-provided sample color.

16. The method of claim 15, wherein the minimum mathematical distance is determined using a metric selected from a Euclidean metric, a taxicab metric, or a Chebyshev metric.

17. The method of claim 10, wherein the plurality of swatch colors in the physical color swatch are spread evenly across an entire spectrum of visible colors.

18. The method of claim 10, wherein the providing the physical color swatch in step (b) comprises providing a plurality of physical arrays, wherein each of the plurality of the physical arrays comprises an identifier, and wherein a subset of the identifiers links a subset of the plurality of the physical arrays to the standard color data set of step (a).

* * * * *